(12) United States Patent
Murayama et al.

(10) Patent No.: US 8,958,700 B2
(45) Date of Patent: Feb. 17, 2015

(54) SPATIAL LIGHT COMMUNICATION DEVICE

(71) Applicant: Outstanding Technology Co., Ltd., Tokyo (JP)

(72) Inventors: Fumitaka Murayama, Tokyo (JP); Hiroyuki Kurokawa, Tokyo (JP); Hiroki Narusawa, Tokyo (JP)

(73) Assignee: VLC Co., Ltd., Naha-shi (JP)

( * ) Notice: Subject to any disclaimer, the term of this patent is extended or adjusted under 35 U.S.C. 154(b) by 253 days.

(21) Appl. No.: 13/685,867

(22) Filed: Nov. 27, 2012

(65) Prior Publication Data

US 2013/0336662 A1    Dec. 19, 2013

(30) Foreign Application Priority Data

Jun. 15, 2012   (JP) .................................. 2012-136251

(51) Int. Cl.
  *H04B 10/116*   (2013.01)
(52) U.S. Cl.
  CPC .................................... *H04B 10/116* (2013.01)
  USPC .......................................... 398/127; 398/130
(58) Field of Classification Search
  CPC ........... H04B 10/1141; H04B 10/1149; H04B 10/116
  USPC ................................................. 398/127, 130
  See application file for complete search history.

(56) References Cited

U.S. PATENT DOCUMENTS

2006/0056855 A1   3/2006   Nakagawa et al.
2010/0040241 A1   2/2010   Sowada

FOREIGN PATENT DOCUMENTS

| EP | 0585030 A1 | 3/1994 |
| EP | 2106041 A1 | 9/2009 |
| JP | 11-024619 A | 1/1999 |
| KR | 10-2005-0003481 A | 1/2005 |
| KR | 10-2011-0109993 A | 10/2011 |

OTHER PUBLICATIONS

Extended European Search Report dated Oct. 4, 2013, issued in corresponding European Patent Application No. 13166416.1 (4 pages).
Office Action dated Feb. 27, 2014, issued in Korean application No. 10-2013-0003894 with English Translation(10 pages).

*Primary Examiner* — Nathan Curs
(74) *Attorney, Agent, or Firm* — Westerman, Hattori, Daniels & Adrian, LLP (57) ABSTRACT

The spatial light communication device is constituted with a spatial light transmitter which is installed in a fixed manner in a plurality of places, stores preset ID information of its own and has a light emitting portion for emitting spatial light on which the ID information is superimposed, and a spatial light receiver which is connected to a handheld terminal, has a light receiving portion for receiving spatial light emitted from the light emitting portion of the spatial light transmitter and also has a light receiving circuit for amplifying and outputting a light receiving signal of the light receiving portion. The spatial light receiver is provided with a connector portion which is connected to a microphone input terminal of the handheld terminal as a terminal for outputting a light receiving output signal of the light receiving circuit to the handheld terminal.

11 Claims, 9 Drawing Sheets

| Start | ID information | additional information | CRC |

SPATIAL LIGHT COMMUNICATION DEVICE

BACKGROUND OF THE INVENTION

1. Field of the Invention

The present invention relates to a spatial light communication device which is used by being connected to a handheld terminal such as a handheld information terminal and a mobile phone and which transmits an information signal from a transmitter to a receiver, with the information signal superimposed on spatial light, for the purpose of providing a user with necessary information such as content information.

2. Description of Related Art

JP H11-24619 A has proposed a conventional audio guide system which uses, for example, infrared data communication to provide visitors at public facilities and the like with an audio guide such as information on facilities, description of exhibits on display and guidance of the facilities.

The conventional audio guide system is equipped with a recorder portion which records an audio signal, an FM transmitting circuit in which the audio signal reproduced from the recorder portion is subjected to frequency modulation (FM) and an infrared emitting portion which superimposes a transmitting signal output from the FM transmitting circuit on an infrared ray to emit the infrared ray. The audio guide system is installed at various areas such as a variety of exhibition sites in facilities.

Further, each audio guide system is provided with an infrared ray sensor for detecting humans and constituted so that visitors at facilities are given an infrared ray FM receiver to receive an audio guide. The audio guide system is used in such a manner that when a visitor having the infrared ray FM receiver comes close to the audio guide system, the infrared ray sensor detects the visitor and the audio guide system superimposes the audio guide on an infrared ray to transmit it to the FM receiver, by which the visitor listens to the audio guide through the FM receiver.

However, where the above-described conventional audio guide system is installed, for example, at a plurality of places in various types of facilities such as a gymnasium, a municipal hall, a museum and an art gallery, the audio guide is different depending on each place in various types of facilities. It is, therefore, necessary to prepare a record portion which records audio guide data thereof and allow an audio guide system at each installation place to store the data. Further, construction work is also necessary for installing these individual audio guide systems at various installation places. Thus, additional time and labor are necessary in the construction work for installation, which poses a problem.

Further, for example, in the case of a museum or an art gallery, an audio guide system is installed for each exhibit on display. And, the audio guide system requires a change of the audio guide every time exhibits on display are changed. However, as with the above case, it is necessary to store the thus changed audio guide data in each audio guide system. For this type of work additional time and labor are required and this poses a problem.

On the other hand, in recent years, handheld terminals such as mobile phones have been used quite extensively and are becoming essential items for most people in everyday life. In mobile phones, information such as phone calls, e-mail and images is usually transmitted via a mobile phone communication network by radio waves. And, therefore, transmission of the information is slow.

For this reason, for example, where people with visual disabilities moving around town or the like want to immediately obtain necessary precautionary information for a place of movement or where users moving around town or the like want to immediately obtain position information and map information of the place, they are not able to obtain the information in a timely manner by operating the mobile phones via a mobile phone communication network, or physically handicapped people are not able to immediately obtain necessary information.

Further, mobile phone communication networks by radio waves are mostly unusable at the time of a disaster such as an earthquake, and even in such a situation that a power source is available and users are able to use mobile phones at the time of a disaster, such as an earthquake, no necessary information is obtained through handheld terminals due to troubles of mobile phone communication networks by radio waves. This also poses a problem.

SUMMARY OF THE INVENTION

An object of the present invention is to provide a spatial light communication device which is capable of providing users with necessary information quickly and conveniently through handheld terminals. The object of the present invention can be attained by the spatial light communication device having a configuration given below.

That is, the spatial light communication device of the present invention is a spatial light communication device which is composed of a spatial light transmitter which has a light emitting portion for emitting spatial light on which an information signal stored in advance or an information signal input externally is superimposed, and a spatial light receiver which is connected to a handheld terminal, has a light receiving portion for receiving spatial light emitted from the light emitting portion of the spatial light transmitter and also has a light receiving circuit for amplifying and outputting a light receiving signal of the light receiving portion. The spatial light transmitter is provided with the light emitting portion which emits spatial light from a light emitting element, a light emission driving circuit which operates the light emitting element so as to emit light and a transmission signal reproducing portion which modulates a carrier wave by the information signal stored in advance or the information signal input externally to reproduce a transmission signal, thereby outputting the signal to the light emission driving circuit. The spatial light receiver is provided with a connector portion which is connected to a microphone input terminal of the handheld terminal as a terminal for outputting a light receiving output signal of the light receiving circuit to the handheld terminal.

Here, the spatial light is a concept which includes visible light, infrared light (infrared ray) and ultraviolet light (ultraviolet ray). Further, information of the above-described information signal includes, for example, text, sounds, images, video, application software, control information of the software, guidance information, device failure information, ID information (identification information) on a device of its own, or URL information which indicates places of information resources such as text and images present on a network.

According to the present invention, the spatial light receiver of the spatial light communication device is used by connecting to a microphone input terminal of a handheld terminal such as a handheld information terminal or a mobile phone, by which information transmitted by being superimposed on spatial light from a spatial light transmitter installed on a ceiling or the like at a specific position can be input from the spatial light receiver to the handheld terminal. Thus, it is possible to immediately input necessary information to the handheld terminal and reproduce the information through the handheld terminal not through a wireless LAN or a mobile phone communication network which uses radio waves.

Further, the spatial light receiver can be constituted only with a light receiving portion and a light receiving circuit which amplifies the light receiving signal. Therefore, it can be downsized to a remarkable extent and used as it is just by being connected to a microphone input terminal of various handheld terminals.

Here, the above-described spatial light transmitter is provided with an ID information storage portion which stores ID information of its own. And, the transmission signal reproducing portion modulates a carrier wave by using an information signal containing the ID information, reproducing a transmission signal and outputting the signal to the light emission driving circuit, thereby emitting spatial light on which the information signal containing the ID information is superimposed. Thereby, the ID information transmitted from the spatial light transmitter is input from the spatial light receiver to a handheld terminal of a user. The handheld terminal is able to reproduce content information, etc., stored in advance or obtained through a network on the basis of the ID information and also able to reproduce the content information and the like more quickly than a case where the content information is transmitted to the handheld terminal from the spatial light transmitter through the spatial light receiver.

Here, in the above-described spatial light communication device, the handheld terminal samples an analog signal input through a connector portion of the spatial light receiver at a predetermined cycle, converting the analog signal to a digital signal and demodulating the digital signal to obtain ID information, thereby selecting and reproducing various types of content on the basis of the ID information.

Thereby, where many exhibits on display are arranged in large facilities such as an art gallery and explanation content on these exhibits on display is provided to users and when a user having a handheld terminal comes close to each of the exhibits on display, explanation content on an exhibit concerned on the display is selected and reproduced on the basis of ID information which is superimposed on spatial light and then transmitted. Therefore, explanation content and the like on individual exhibits on display can be automatically provided to the user through the handheld terminal. Further, information to be transmitted to a spatial light receiver of each handheld terminal from a transmitter by spatial light is to be only the ID information. Thus, as compared with a case that content information is transmitted as it is, the spatial light transmitter and the spatial light receiver can be both downsized by simplifying a circuit configuration. Further, they are less likely to be influenced by noise, etc., on transmission and also able to quickly provide appropriate content.

Still further, a spatial light transmitter which is simple in configuration and stores ID information is installed in the vicinity of each exhibit on display or the like, by which ID information superimposed on spatial light may be transmitted from the light emitting portion. Thus, it is possible to install quite simply many transmitters at necessary sites. In addition, where exhibits on display, etc., are changed, the change can be made only by changing the content corresponding to the ID information which can be made to respond simply and conveniently.

Here, it is possible to use an LED or an organic EL element which irradiates visible light for lighting as a light emitting element installed at the light emitting portion of the spatial light transmitter. It is also possible to use a photo diode for visible light as a light receiving element installed at a photodetector of the spatial light receiver. Further, a screw fitting attachable to an electric-bulb socket can be installed at a power source input portion of the spatial light transmitter. Thereby, it is possible to use the spatial light transmitter also as a lighting fixture and install the spatial light transmitter simply and harmoniously at exhibition facilities such as an art gallery or a museum.

Still further, when the above-described handheld terminal is provided with a storage portion for storing content information supplied to a user and content information of the storage portion is changed, access is made to a content server on a network or by way of a transfer cable or an external memory to collect the content information, thus making it possible to store the content information at the storage portion so as to correspond to the ID information.

Thereby, for example, where exhibits on display are changed in an art gallery and the like and explanation content is changed accordingly, a management computer, etc., can be used to access the content server on the network and the like, thereby uploading and changing the content corresponding to the ID information. Upon a change in the content, a handheld terminal is able to access the content server, downloading content after a change or taking them into content storing means by way of a transfer cable and an external memory. It is, thus, possible to easily provide a user with the changed content.

The handheld terminal is also able to store at the storage portion control information including information for running a software program activated in the handheld terminal in place of the content information supplied to a user. In this instance, where the content information of the storage portion or the control information on the software program is changed, access is made to the content server or via a transfer cable, an external memory, etc., thereby collecting the content information or the control information on the software program. And, the content information or the control information on the software program is stored at the storage portion so as to correspond to the ID information.

Further, it is preferable that a power source line which inputs direct-current electricity supplied from the microphone input terminal of the handheld terminal is installed at the light receiving portion and the light receiving circuit of the spatial light receiver, and a capacitor is connected between the power source line and the ground. Thereby, electricity accumulated at the capacitor connected to the power source line can be used as a power source for the light receiving portion and the light receiving circuit of the spatial light receiver. Thus, there is eliminated a necessity for installing an independent and exclusive-use power source at the spatial light receiver. As a result, the spatial light receiver can be downsized to a remarkable extent and also used simply and conveniently by being connected to the microphone input terminal of the handheld terminal.

As described above, according to the spatial light communication device of the present invention, the spatial light receiver can be simply and conveniently used by being connected to the microphone input terminal of the handheld terminal. And, a user of the handheld terminal is able to quickly obtain necessary information at various places without using a mobile phone communication network or wireless LAN by radio waves.

DESCRIPTION OF THE PREFERRED EMBODIMENTS

Hereinafter, a description will be given of the present invention on the basis of the embodiment shown in the drawings. The present invention shall not be limited to the embodiment, and any changes within requirements of claims and equivalents concerning the requirements shall be included in the scope of the claims.

Figure 5:
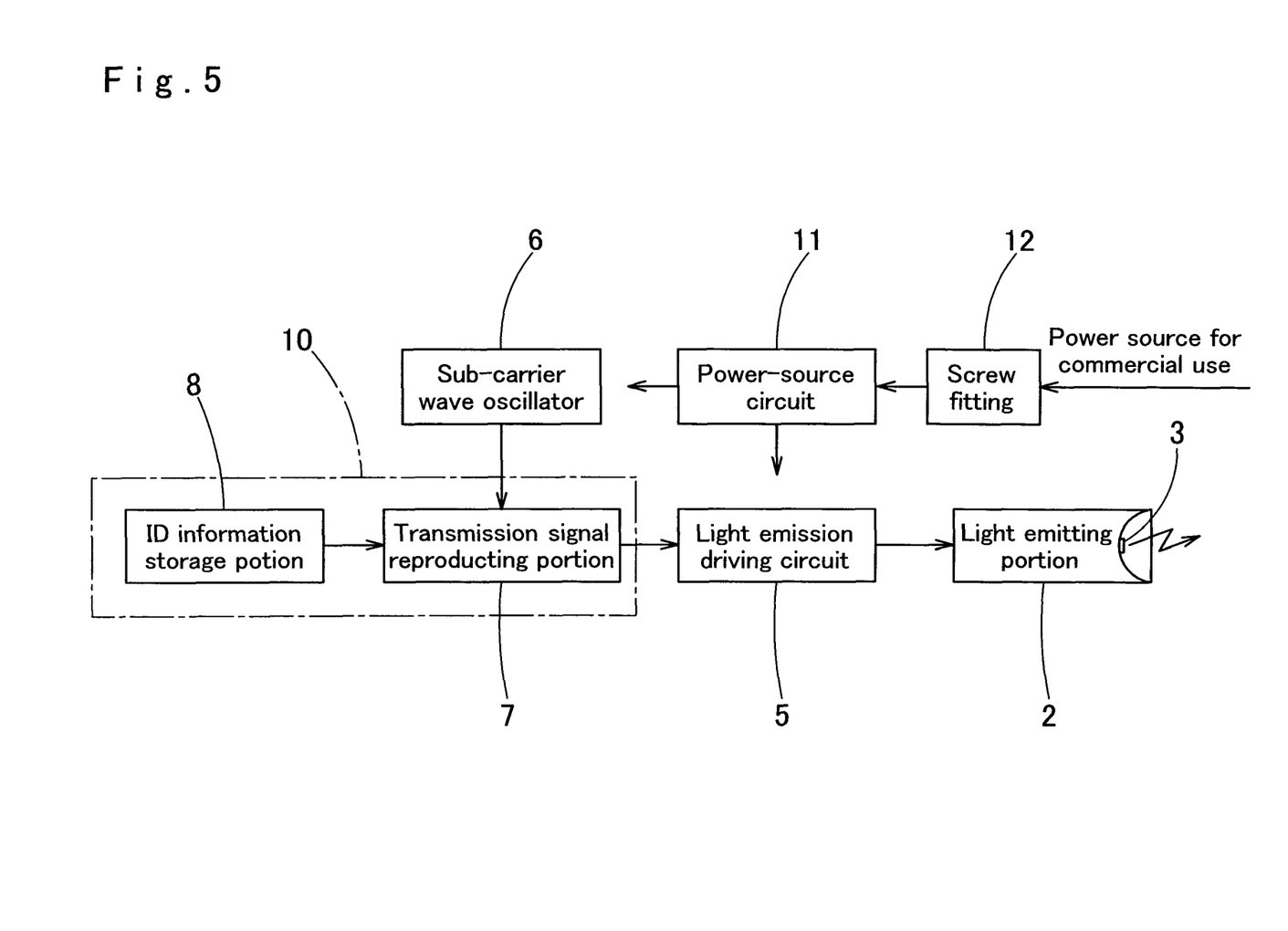
FIG. 5 is a configuration block diagram which shows a circuit of the transmitter.
Figure 7:
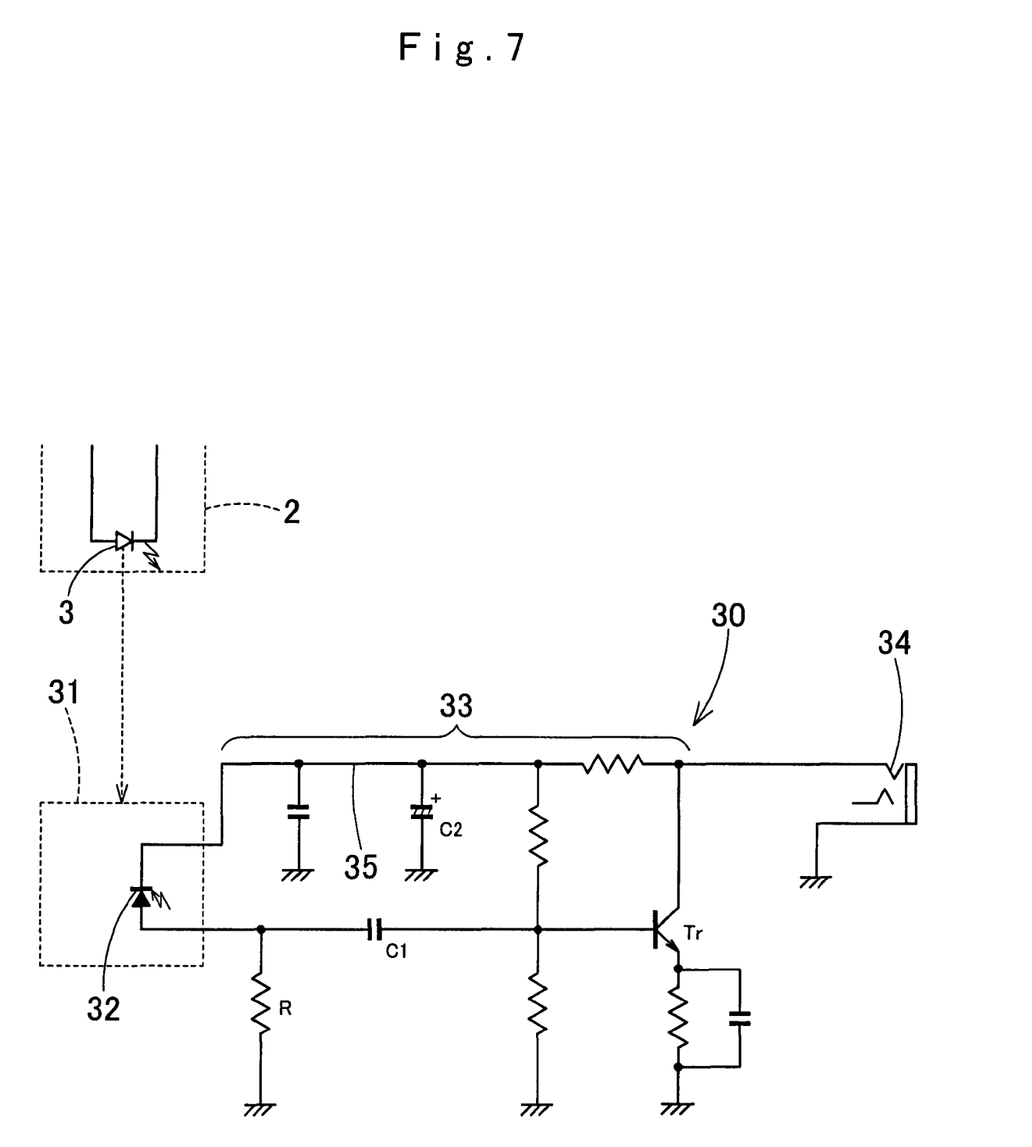
FIG. 7 is a circuit diagram which shows a spatial light receiver.

The spatial light communication device is constituted with a spatial light transmitter 1 shown in FIG. 5 which is installed in a fixed manner in a plurality of places, stores preset ID information of its own and has a light emitting portion 2 for emitting spatial light on which the ID information is superimposed and a spatial light receiver 30 shown in FIG. 7 which is connected to a handheld terminal 40, has a light receiving portion 31 for receiving the spatial light emitted from the light emitting portion 2 of the spatial light transmitter 1 and also has a light receiving circuit 33 for amplifying and outputting a light receiving signal of the light receiving portion 31.

Figure 8:
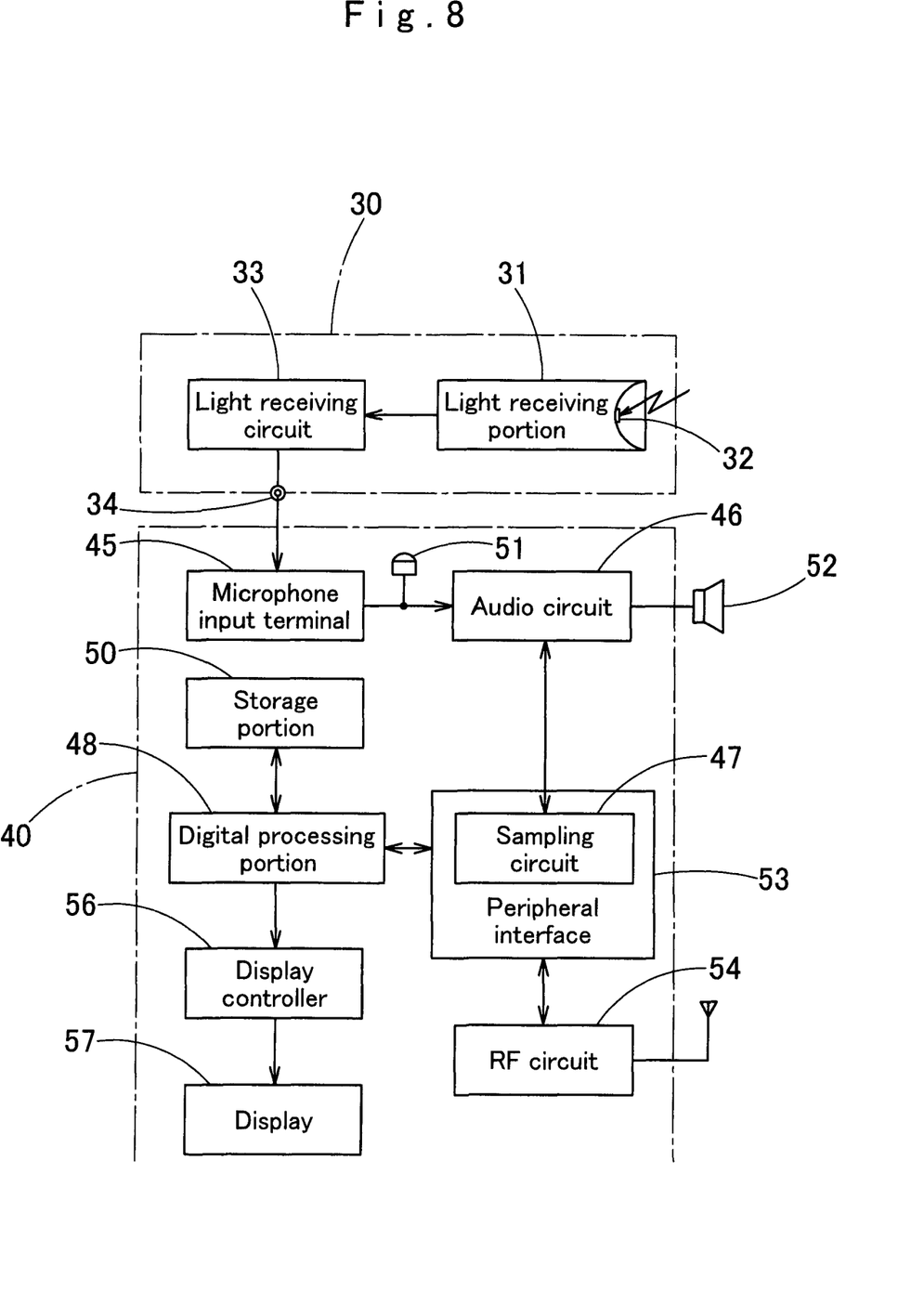
FIG. 8 is a configuration diagram which shows the spatial light receiver and a handheld terminal.

As shown in FIG. 8, the spatial light receiver 30 is provided with a connector portion 34 connected to a microphone input terminal 45 of the handheld terminal 40 as a terminal for outputting a light receiving output signal of the light receiving circuit 33 to the handheld terminal 40. As the connector portion 34, there may be used, for example, a microphone plug which can be directly inserted into the microphone input terminal 45 or a microphone connector which is inserted and connected to a microphone plug at the leading end of a connection cable.

As shown in FIG. 1 to FIG. 4, in the spatial light transmitter 1 for emitting spatial light, a main body case 1a thereof is formed in the shape of an electric bulb having a light emitting portion 2 at the leading end thereof and houses inside the main body case 1a a circuit necessary for visible light communication as transmitting spatial light. The spatial light transmitter 1 is installed in the vicinity of various exhibits on display, for example, in an art gallery and a museum, that is, at places where explanation content is provided to users. This spatial light transmitter 1 is formed in the shape of an electric bulb so as to make simple construction work for installation and also so as to be installed simply and harmoniously as a lighting fixture as well.

The spatial light transmitter 1 is provided with the main body case 1a formed in the shape of an electric bulb. The light emitting portion 2 for emitting spatial light from a light emitting element 3 is installed at the leading end of the main body case 1a, and a screw fitting 12 is installed at the terminal end thereof as a screw fitting/power source input portion. Thereby, the spatial light transmitter 1 is installed at a predetermined installation place such as inside facilities, for example, at a place where explanation content is provided.

And, the spatial light transmitter 1 is structured so as to be easily attached via the screw fitting 12 into an electric-bulb socket connected to an alternative-current power source.

Figure 1:
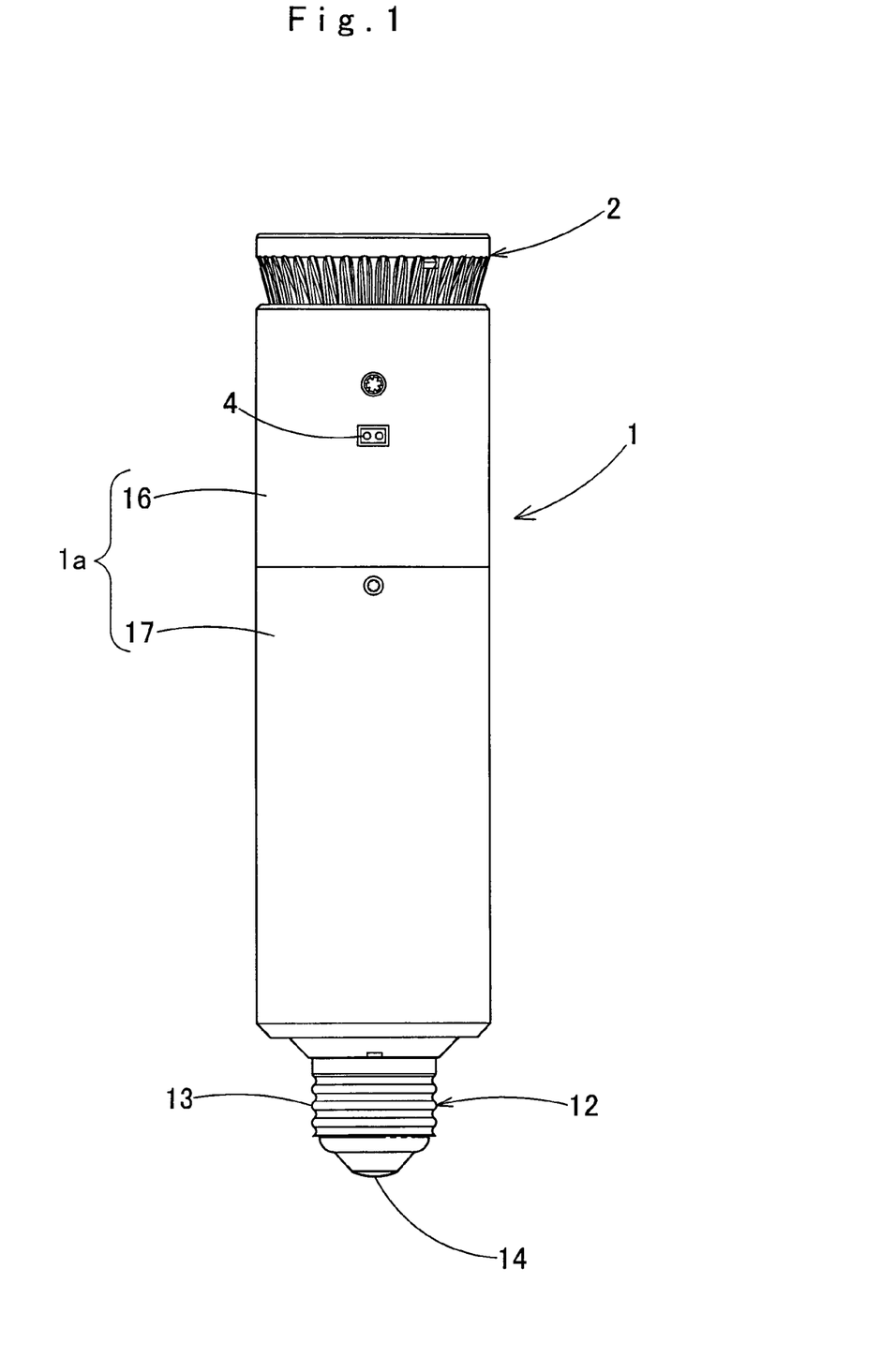
FIG. 1 is a front view which shows a spatial light transmitter of a spatial light communication device which is one embodiment of the present invention.
Figure 2A:
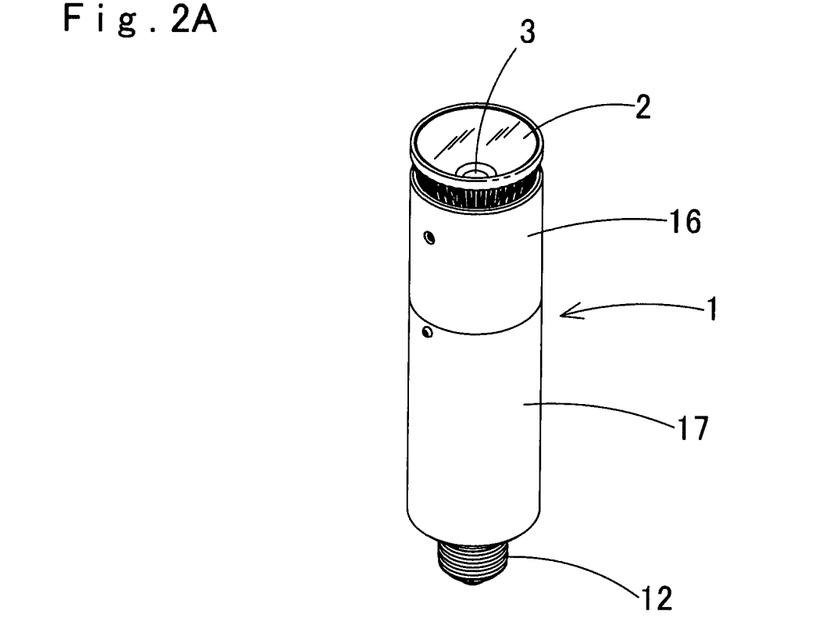
FIG. 2A is a perspective view of the transmitter taken from obliquely above.
Figure 2B:
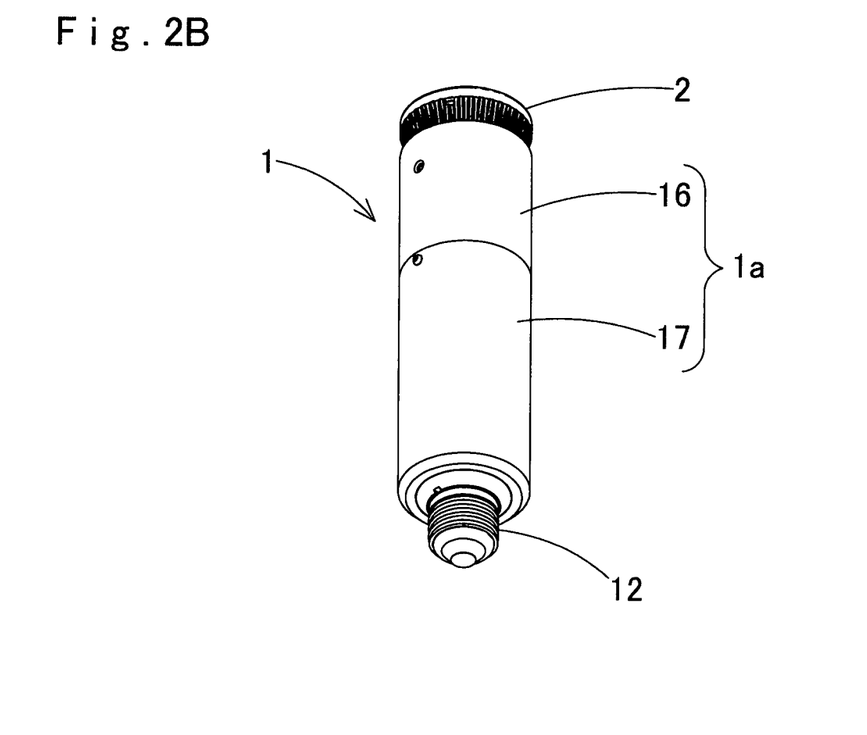
FIG. 2B is a perspective view thereof taken from obliquely below.
Figure 3:
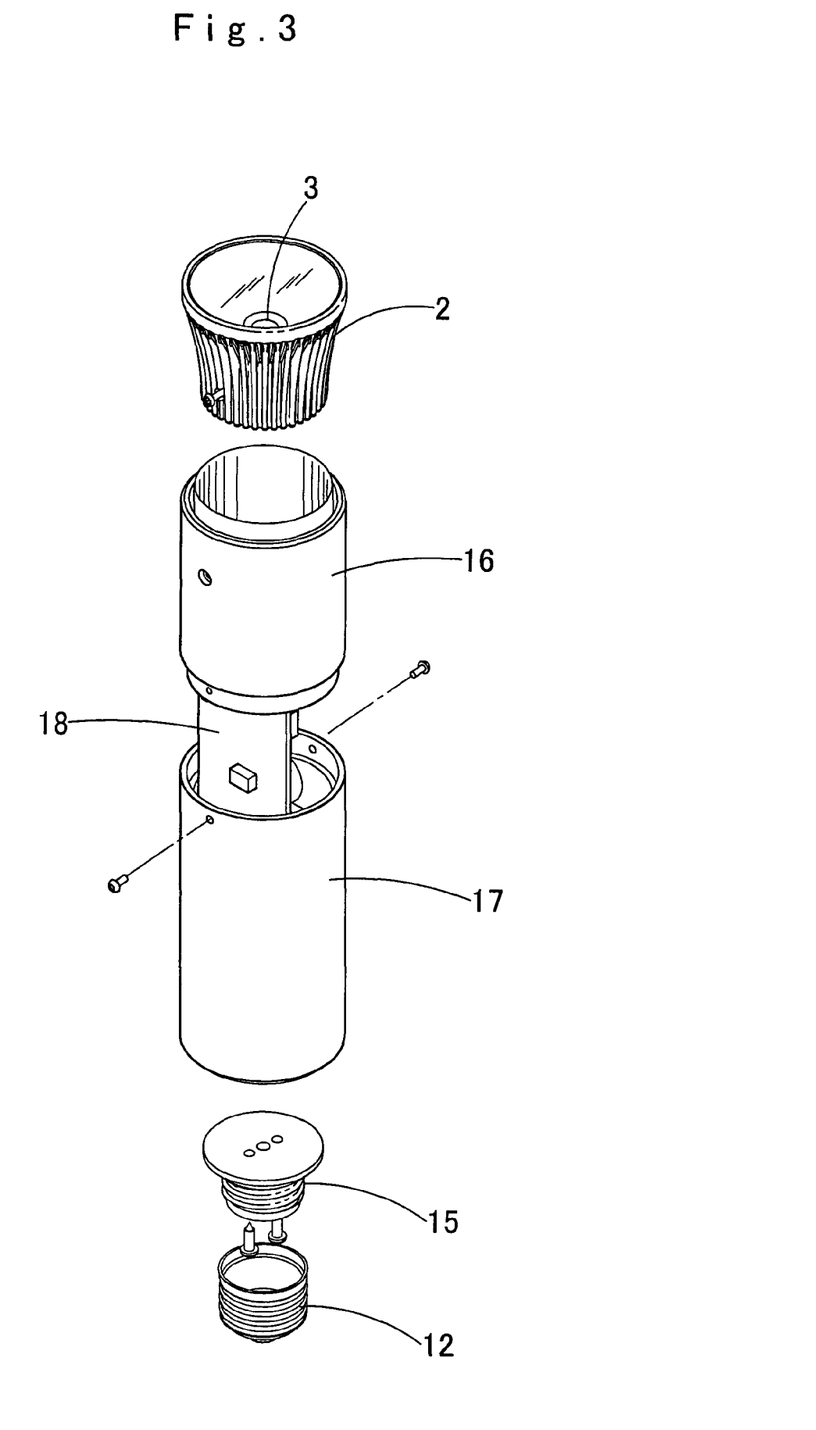
FIG. 3 is an exploded perspective view of the transmitter.
Figure 4:
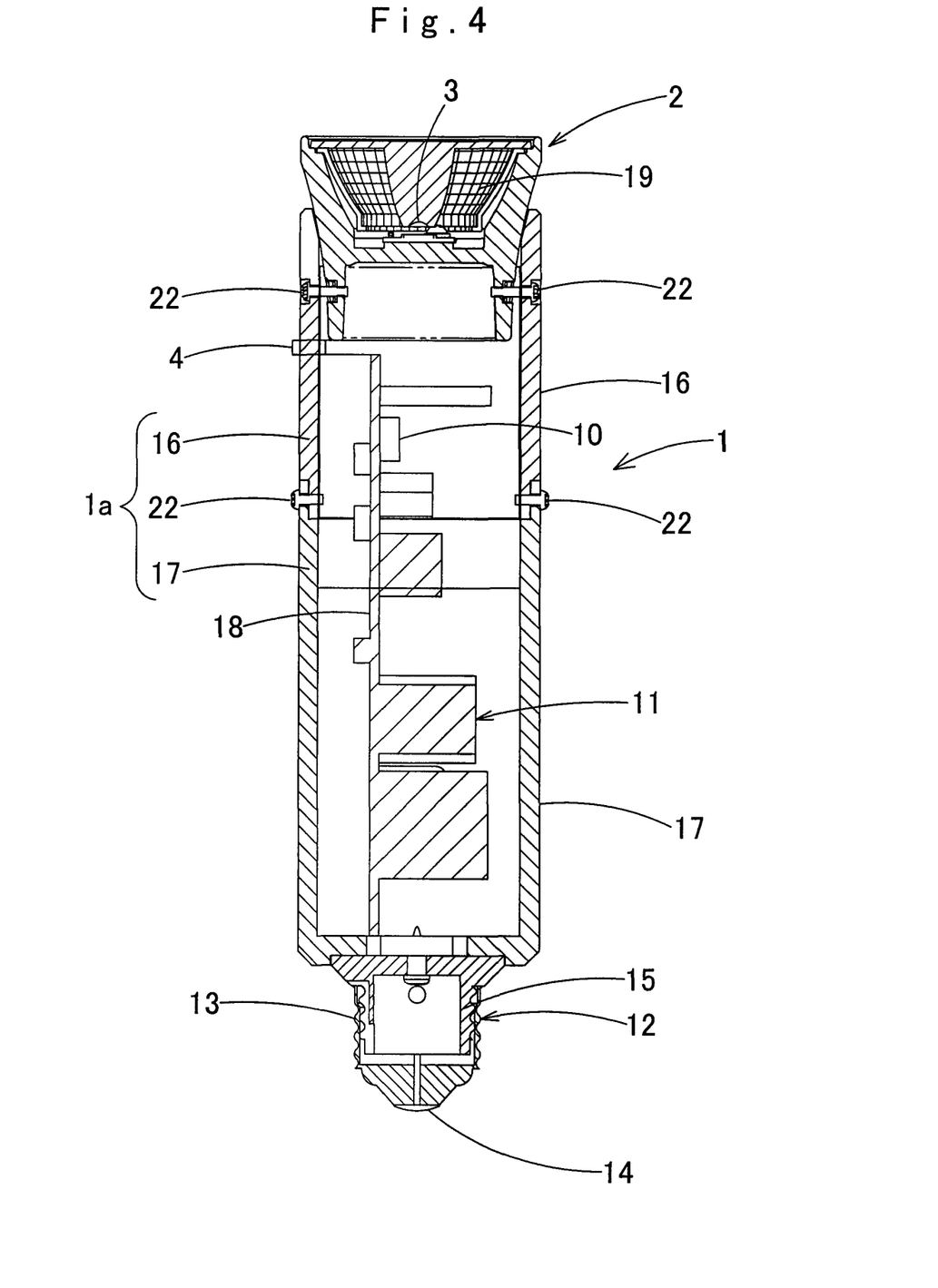
FIG. 4 is a longitudinal sectional view of the transmitter.

As the light emitting element 3 of the light emitting portion 2, there is used, for example, a visible light emitting diode which emits white light. As shown in FIG. 4, an LED module thereof is installed at the center of a cup-shaped reflector 19, and the front face of the light emitting portion 2 is covered with a transparent plate. And, as will be described later, visible light on which a transmission signal including ID information and additional information is superimposed is irradiated forward. Visible light irradiated from the light emitting element 3 of the light emitting portion 2 is to be emitted to the vicinity of exhibits on display from above in an angle range of 10 to 20 degrees, for example.

Where a white-light emitting diode is used as the light emitting element 3, it is able to irradiate exhibits on display and the like as illumination light. Thereby, the white-light emitting diode can be used as a device which functions not only as a visible light communication transmitter but also as a lighting fixture. In addition to such a white-light emitting diode, an infrared ray emitting diode which emits infrared rays (near-infrared light) can be used as the light emitting element 3 of the spatial light transmitter 1. In this instance, an infrared ray photo diode is used as the light receiving element 32 of the spatial light receiver 30.

The main body case 1a is composed of an upper case 16 formed in the shape of a cylinder and a lower case 17 connected to a lower part of the upper case 16. The light emitting portion 2 is fixed on an upper part of the upper case 16. As shown in FIG. 5, there are housed inside the upper case 16, a light emission driving circuit 5 which emits and activates the light emitting element 3, a sub-carrier wave oscillator 6 which oscillates and outputs, for example a 28.8 kHz sub-carrier wave, a transmission signal reproducing portion 7 which modulates the sub-carrier wave by an information signal including ID information and additional information of the spatial light transmitter 1 to reproduce a transmission signal, thereby outputting the signal to the light emission driving circuit 5, and an ID information storage portion 8 which stores in advance the ID information of the spatial light transmitter 1. The sub-carrier wave oscillator 6 which oscillates and outputs the sub-carrier wave is named in a case where the transmission medium of light is given as a main carrier wave. Also, it is simply a carrier wave oscillator which oscillates and outputs a carrier wave.

As shown in FIG. 4, the light emitting portion 2, the upper case 16 and the lower case 17 of the main body case 1a are structured so as to be assembled and disassembled by fixing screws 22. Where, for example, model information and ID information are written or the like, a signal wire is connected to a microcomputer 10 and, the ID information and additional information and the like of the spatial light transmitter 1 can be written in the ID information storage portion 8 shown in FIG. 5.

A power source circuit 11 which serves as a power source of the circuit is housed in the lower case 17. The power source circuit 11 is configured with an AC/DC converter which converts an alternative-current power source such as a commercial-use power source to direct currents with a predetermined voltage. The alternative-current power source is supplied from the screw fitting 12 arranged at the terminal end of the main body case 1a. A switching inverter circuit is used in the AC/DC converter, and the circuit small in dimension is used to convert alternative-currents of the commercial-use power source to direct currents of DC 12V, for example.

The screw fitting 12 is constituted with a shell portion 13 serving as a screw portion and an eyelet portion 14 which is attached below at the center of the shell portion 13 via an insulating material 15. One input terminal of the power source circuit 11 is connected internally to the eyelet portion 14, while the other input terminal is connected internally to the shell portion 13.

As described above, the screw fitting 12 is formed as a screw fitting which is standardized as E17, E18, E26, etc., and made so as to be screwed into a predetermined electric-bulb socket and easily attached. The screw fitting 12 as the fitting portion/power source input portion is provided with a screw portion-type shell portion 13. However, for example, a cylindrical attaching/connecting member other than a screw-type shell portion may also be usable.

The transmission signal reproducing portion 7 and the ID information storage portion 8 shown in FIG. 5 are constituted with a one-chip type microcomputer 10 and constituted so that the sub-carrier wave signal is modulated on the basis of program data stored in the memory in advance, for example, by 4-ary PPM (pulse position modulation) according to the ID information of the spatial light transmitter 1, thereby outputting the modulated transmission signal to the light emission driving circuit 5. As shown in FIG. 4, the one-chip type microcomputer 10, the sub-carrier wave oscillator 6 and the light emission driving circuit 5 are loaded into a circuit substrate 18 inside the main body case 1*a*.

The ID information storage portion 8 is a storage portion which stores ID information on various spatial light transmitters 1 used in spatial light communication devices, that is, a portion which stores an identification number unique to the spatial light transmitter concerned and also a storage portion which writes ID information for identifying places where the various spatial light transmitters 1 are installed or explanation content information and guidance information. The ID information storage portion 8 is able to store additional information such as model information which indicates types of spatial light transmitters 1 together with the ID information. Further, although the ID information is stored in advance in the ID information storage portion 8, there may be stored reference information sent externally.

Figure 6:
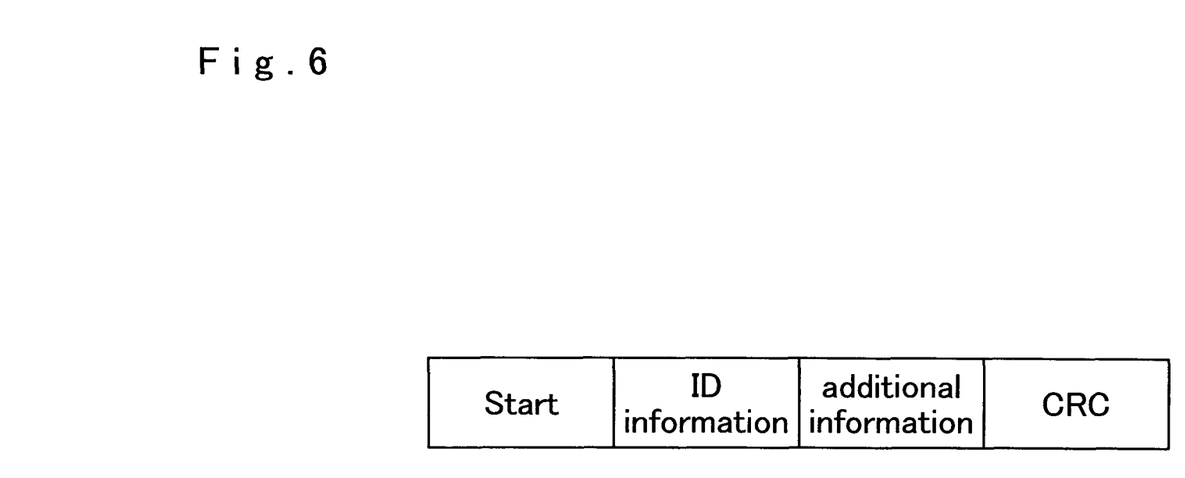
FIG. 6 is a configuration diagram which shows a data frame.

As shown in FIG. 6, the transmission signal reproducing portion 7 of the microcomputer 10 prepares a data frame and reproduces the data frame of a transmission signal so that in continuation of a start frame composed of a preamble and a frame type, for example, data on the ID information and additional information is arranged as payload and CRC (cyclic redundancy code) for checking is arranged as an end frame.

Further, the transmission signal reproducing portion 7 is constituted in such a manner that a sub-carrier wave input from the sub-carrier wave oscillator 6 is subjected to 4-ary PPM (pulse position modulation) by using data of the above data frame, that is, data which contains ID information on devices and any given additional information such as model information to output an information transmission signal. A 4-ary PPM circuit divides data to be transmitted into a 2 bit unit and carries out digital coding according to four pieces of 2 bit data so that for example, "00", "01", "10" and "11" are respectively given as "1000", "0100", "001 0" and "0001". Then, a pulse which identifies a code position of the digital signal concerned is generated and activated so that the sub-carrier wave is modulated by the data pulse thereof. Thereby, the spatial light transmitter 1 is to irradiate and transmit visible light having constant illuminance, irrespective of data to be transmitted.

In the transmission signal reproducing portion 7, the sub-carrier wave is subjected to 4-ary PPM by the information transmission signal to reproduce a transmission signal. However, ASK modulation, FSK modulation or PSK modulation and the like can be carried out in place of PPM to reproduce the transmission signal. Alternatively, it is acceptable that without modulation of carrier waves, an information transmission signal is pulsed by a base band method and the pulsed transmission signal is superimposed on spatial light and transmitted.

The light emission driving circuit 5 shown in FIG. 5 is configured so that a modulated information transmission signal sent from the transmission signal reproducing portion 7 of the microcomputer 10 is input and the light emitting element 3 of the light emitting portion 2 is driven to emit visible light and also the information transmission signal is superimposed on the visible light.

On the other hand, as shown in FIG. 7 and FIG. 8, the spatial light receiver 30 is downsized to a remarkable extent and constituted with a light receiving portion 31 having a light receiving element 32 and a light receiving circuit 33 which amplifies and outputs a light receiving signal generated at the light receiving element 32. The light receiving circuit 33 is provided with a connector portion 34 which outputs the amplified light-receiving analog signal and used by connecting the connector portion 34 to the microphone input terminal 45 of the handheld terminal 40.

The connector portion 34 is, as described above, a female-type connector so that a plug at the end of a connection cable can be inserted. Where the microphone input terminal 45 of the handheld terminal 40 is the female-type connector, a microphone jack (plug) is projected as the connector portion 34 outside a case of the spatial light receiver 30, by which the connector portion 34 can be directly inserted into the microphone input terminal 45 of the handheld terminal 40. Further, in the case of a connector in which the microphone input terminal 45 of the handheld terminal 40 is integrally formed with an earphone terminal, a cable may be connected in such a manner that only the microphone input terminal of the connector is used.

The light receiving portion 31 of the spatial light receiver 30 is provided with the light receiving element 32 such as a photo diode which receives visible light to output a light receiving signal. The light receiving portion 31 receives visible light emitted from the light emitting portion 2 of the spatial light transmitter 1 and outputs the light receiving signal to the light receiving circuit 33. As shown in FIG. 7, an anode of the light receiving element 32 is connected to the power source line 35, while a cathode of the light receiving element is connected to the ground via a resistance R and also connected to a base of a transistor Tr for an amplifier via a capacitor C1.

Thereby, when the light receiving element 32 receives visible light to generate light-receiving currents, voltage corresponding to the light-receiving currents is generated to the both ends of the resistance R. A light-receiving voltage signal thereof is applied to the base of the transistor Tr to amplify the signal by activation of the transistor Tr and the amplified light receiving signal is to be output through the connector portion 34 from a collector of the transistor Tr.

The spatial light receiver 30 is used by connecting the connector portion 34 to the microphone input terminal 45 of the handheld terminal 40 of a user. The microphone input terminal 45 installed on the handheld terminal 40 is a terminal for a capacitor microphone and constituted so that direct-current electricity is output from the terminal for driving the capacitor microphone.

Therefore, the power source of the spatial light receiver 30 is constituted so that direct-current voltage supplied from the microphone input terminal 45 of the handheld terminal 40 is input to the power source line 35 and accumulated in a capacitor C2 connected between the power source line 35 and the ground, and direct-current electricity released from the capacitor C2 is used as a power source by the light receiving circuit 33 of the spatial light receiver 30.

Further, the side of the handheld terminal 40 is constituted so that a slight reduction in voltage of the power source applied thereto when the connector portion 34 is connected to the microphone input terminal 45 is detected to automatically run software for extracting ID information on the basis of plug and play.

As described above, the power source of the light receiving portion 31 and the light receiving circuit 33 in the spatial light receiver 30 is structured so that electricity is supplied through the microphone input terminal 45 of the handheld terminal 40. Therefore, the spatial light receiver 30 does not need a power source such as a battery and can be downsized to a remarkable extent. Further, as shown in FIG. 7, the light receiving portion 31 and the light receiving circuit 33 can be made extremely simple in circuit configuration because the capacitor C2 is only connected to an amplifier for amplifying a light receiving signal of the light receiving element 32 and also to the power source line 35. Still further, since the light receiving signal amplified by the amplifier of the light receiving circuit 33 is sent to the microphone input terminal 45, it is possible to send the light receiving signal favorable in S/N ratio to the handheld terminal 40.

If the light-receiving voltage signal favorable in S/N ratio is obtained upon receipt of light by the light receiving element 32 of the light receiving portion 31 and ID information can be extracted from the light receiving signal on the side of the handheld terminal 40, the amplifier for amplifying the light receiving signal is not necessarily required. Therefore, where the light-receiving voltage signal of the light receiving element 32 is obtained at an S/N ratio to as high an extent as possible in obtaining the ID information, light receiving circuit 33 is not required. And, an audio circuit 46 of the handheld terminal 40 is able to take in the effective light receiving signal even by directly connecting the anode and the cathode of the light receiving element 32 to the microphone input terminal 45.

Further, where, for example, the microphone input terminal 45 of the handheld terminal 40 is constituted as an input terminal for a dynamic microphone which does not need a power source and no direct-current power source is supplied from the handheld terminal 40, it is desirable that the spatial light receiver 30 has the light receiving element 32 which uses a light receiving element capable of obtaining a light-receiving voltage signal favorable in S/N ratio. In this instance, the light receiving circuit of the spatial light receiver 30 is constituted so that a direct-current power source supplied externally is not necessary. And, an electromotive force of a signal of the light receiving element 32 is used to activate the light receiving circuit 33, thereby inputting an effective analog signal to the microphone input terminal 45. Alternatively, as described above, the spatial light receiver is constituted only with the light receiving element, by which the light receiving signal can be directly input to the microphone input terminal 45 of the handheld terminal 40.

On the other hand, as shown in FIG. 8, the handheld terminal 40 is provided with the audio circuit 46 which makes filtering and level adjustment or the like of an analog signal (audio signal) input through the microphone input terminal 45, and a sampling circuit 47 is connected to the output side of the audio circuit 46. The audio circuit 46 inputs a light receiving signal output from the spatial light receiver 30 through the microphone input terminal 45 to adjust a signal level, and, after subjecting a signal obtained through a filter to waveform shaping, outputs an analog signal thereof to the sampling circuit 47 inside a peripheral interface 53. Further, the audio circuit 46 is connected to a speaker 52 for reproducing sounds and a built-in microphone 51 for inputting sounds for phone calls.

The handheld terminal 40 is provided with the sampling circuit 47 inside the peripheral interface 53, and the sampling circuit 47 samples an analog audio signal at a predetermined cycle and converts the signal to a digital signal. Then, the digital signal output from the sampling circuit 47 is taken in by a digital processing portion 48 and subjected to demodulation.

The handheld terminal 40 is provided with the digital processing portion 48 which contains a CPU and a memory. The digital processing portion 48 is constituted so that the one-chip type microcomputer is given as a major portion. The storage portion 50 which is composed of a non-volatile memory stores software and the like in which a 4-ary PPM signal is demodulated to extract ID information from the PPM signal as application software. The digital processing portion 48 of the handheld terminal 40 is to obtain the ID information on the basis of a 4-ary pulse position by using software for extracting the ID information.

The transmission signal reproducing portion 7 of the spatial light transmitter 1 is able to transmit the ID information by carrying out, for example, ASK modulation, FSK modulation and PSK modulation and the like other than PPM. And, where the spatial light transmitter 1 transmits the ID information by other types of modulation, the digital processing portion 48 of the handheld terminal 40 is to obtain the ID information by conducting demodulation corresponding to ASK modulation, FSK modulation, PSK modulation, etc.

The handheld terminal 40 includes a PDA (personal digital assistant) and a tablet-type terminal which can be connected to a wireless LAN as well as a mobile phone which can be connected to a mobile phone communication network or a wireless LAN. As shown in FIG. 8, the handheld terminal 40 is provided with a touch sensing display 57 which enables touch input for switch-inputting various functions and displays video, static images, texts, etc., and also provided with a display controller 56. A radio frequency (RF) circuit 54 is installed as a wireless telephone module which is for connection to the mobile phone communication network and wireless LAN and also connected to the peripheral interface 53.

Figure 9:
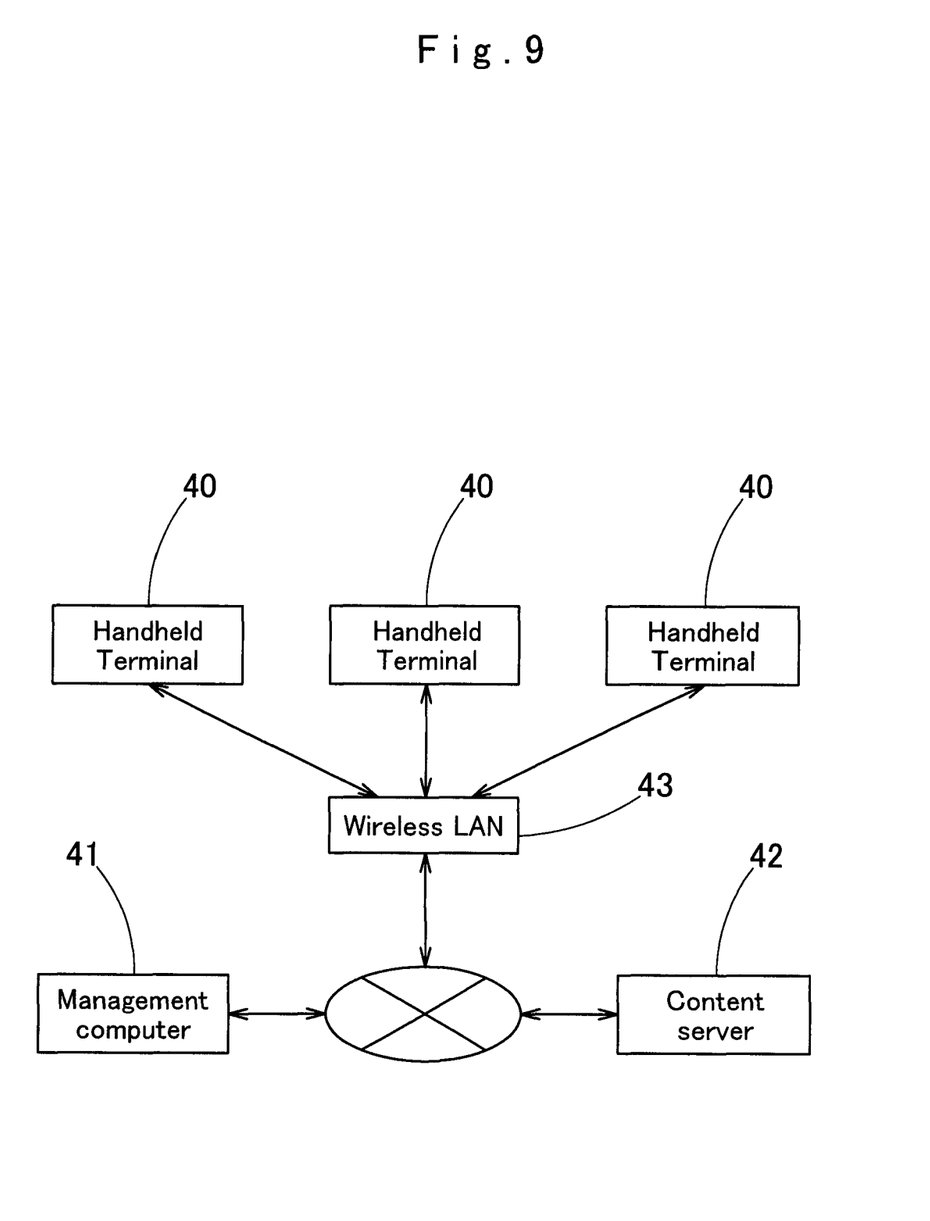
FIG. 9 is a configuration diagram which shows a network connection of the handheld terminal.

As shown in FIG. 9, the handheld terminal 40 can be connected not only to the mobile phone communication network but also to networks such as the Internet via the wireless LAN 43. And, the storage portion 50 of the handheld terminal 40 stores in advance browser software and audio reproduction software as application software. Pluralities of content corresponding to the ID information which are downloaded from the content server 42 on the Internet are also stored at the storage portion 50 of non-volatile memory. Further, as described above, the handheld terminal 40 is provided with the audio circuit 46 for reproducing an audio signal of the content. The microphone input terminal 45 and the built-in microphone 51 are connected to the input side of the audio circuit 46, while a speaker 52 is connected to the output side thereof.

On the other hand, for example, explanation content information on individual exhibits on display at an art gallery is kept in the content server 42 installed on the Internet by using the management computer 41 so as to correspond to the ID information. That is, an administrator uploads the explanation content information prepared in advance by using the management computer 41 to the content server 42 and keeps the information in the non-volatile memory of the content server 42 so as to correspond to the above ID information. When access is made from the handheld terminal 40 in order to download the explanation content, the content server 42 delivers to the handheld terminal 40 the content information corresponding to the ID information.

The spatial light transmitter 1 of the above-constituted spatial light communication device is installed at places where explanation content (audio guide) is provided to users, for example, in the vicinity or the like of exhibits on display at public facilities and the like such as an art gallery or a museum. At an installation place, an electric-bulb socket is provided so as to face downward and the spatial light transmitter 1 is attached by screwing the screw fitting 12 into the electric-bulb socket in a state that the light emitting portion 2 is faced downward. Different ID information is set so as to be allocated to each spatial light transmitter 1, and unique ID information is stored at the ID information storage portion 8 of each spatial light transmitter 1.

Usually, a lighting fixture is disposed above the vicinity of the exhibits on display. Where an electric-bulb socket for the lighting fixture is able to be used, the spatial light transmitter 1 can be installed at a predetermined place by such simple work that the screw fitting 12 is only screwed into the electric-bulb socket and attached, and the spatial light transmitter 1 can also be connected to a power source.

This is particularly advantageous in the event that many spatial light transmitters 1 are installed near individual exhibits on display in an art gallery or a museum where many exhibits on display are installed across a wide area. It is also possible to install many spatial light transmitters 1 simply and efficiently.

Where the handheld terminal 40 is lent to and used by a user as an explanation device for exhibits on display in an art gallery or a museum, the connector portion 34 of the spatial light receiver 30 is used by being directly or via a connection cable connected to the microphone input terminal 45 of the handheld terminal 40. As the handheld terminal 40, there can be used a general-use handheld terminal having the microphone input terminal 45. As described above, since the spatial light receiver 30 is downsized to a remarkable extent, the spatial light receiver 30 can be used simply and harmoniously by being connected directly or via the connection cable to the microphone input terminal 45 of the handheld terminal 40.

Further, ID information unique to each spatial light transmitter and explanation content information corresponding thereto are kept in the handheld terminal 40 in advance. Since the ID information is identification information unique to each spatial light transmitter, it indicates a place where each spatial light transmitter 1 is installed or an exhibit on display at the place concerned. And, the explanation content information corresponds to the exhibit concerned on display or the like. As shown in FIG. 9, the above-described content information is downloaded by operating the handheld terminal 40 and accessing the content server 42 via a network such as the Internet. Where, for example, a new exhibition is held in an art gallery or a museum and the like, at the beginning of the exhibition, the content for explanation concerned is downloaded and kept in the storage portion 50 of the handheld terminal 40, by which the handheld terminal 40 can be used as it is without connecting to the Internet or the like during the period where the exhibition is held. In place of a download by way of a network, content can be written directly in the handheld terminal 40 by using an external memory such as a transfer cable and a USB memory.

In each spatial light transmitter 1 of the spatial light communication device, where facilities such as an art gallery are open and lights are on, the light emitting portion 2 thereof is operated so as to emit light, thereby irradiating and emitting spatial light (visible light) from above to below in a range of some extent near exhibits on display.

At this time, on preparing the data frame, the transmission signal reproducing portion 7 of the spatial light transmitter 1 places data of ID information on payload and any given additional information such as model information into a frame in continuation to the start frame, thereby reproducing a transmission signal.

Further, the transmission signal reproducing portion 7 outputs an information transmission signal by subjecting a sub-carrier wave sent from the sub-carrier wave oscillator 6 to 4-ary PPM by referring to data containing the ID information on a device. The information transmission signal output from the transmission signal reproducing portion 7 is input into the light emission driving circuit 5. Then, the light emission driving circuit 5 drives the light emitting element 3 of the light emitting portion 2 to emit spatial light (visible light), thereby superimposing the information transmission signal on the spatial light and emitting the light from the light emitting portion 2 downward.

A visitor at an art gallery or a museum and the like carries the handheld terminal 40 and moves while looking at individual exhibits on display. When the visitor comes close to each of the exhibits on display, the light receiving portion 31 of the spatial light receiver 30 connected to the handheld terminal 40 receives spatial light emitted to an exhibit on display as illumination light from the light emitting portion 2 of the spatial light transmitter 1 installed in the vicinity of the exhibit on display.

At this time, the light receiving circuit 33 of the light receiving portion 31 of the spatial light receiver 30 uses an amplifier to amplify a subtle light-receiving signal output from the light receiving element 32, thereby outputting a light-receiving analog signal to the handheld terminal 40 through the connector portion 34. The handheld terminal 40 inputs the light-receiving analog signal from the spatial light receiver 30 to the audio circuit 46 through the microphone input terminal 45. Then, the signal is adjusted to a level necessary for demodulation and subjected to filtering to remove high-frequency components, etc. Thereafter, the received light-receiving analog signal is taken into the sampling circuit 47. The sampling circuit 47 samples the signal at a predetermined cycle and converts the signal to a digital signal, thereby outputting the signal to the digital processing portion 48.

The digital processing portion 48 demodulates a transmission signal which is transmitted from the spatial light transmitter 1 and subjected to PPM on the basis of the input digital signal. Since the transmitted transmission signal is a signal subjected to 4-ary PPM, the transmission signal is converted to a digital value to extract the transmitted ID information on the basis of a 4-ary pulse position.

Further, on the basis of the extracted ID information, the handheld terminal 40 reads the content corresponding to the ID information concerned from the storage portion 50, displays images and the like of the content on a display of the terminal and also reproduces an audio signal thereof from the audio circuit 46, thereby outputting sounds from a speaker 52 or an earphone. Thereby, a user of the handheld terminal 40 is able to listen to explanation (audio guide) on an exhibit on display, while looking at the exhibit on display, when coming close to the exhibit on display.

On the other hand, where individual exhibits on display are changed due to a change in exhibition and explanation content is to be changed accordingly, an administrator will access the content server 42 using the management computer 41, thereby updating content information for each ID information kept at a non-volatile memory of the content server 42 to new content information. As described above, the content information to be newly kept is to be kept at the non-volatile memory of the content server 42 corresponding to the ID information. The content to be kept at the storage portion 50 of the handheld terminal 40 can be changed via a transfer cable or by way of an external memory in place of access to the content server.

In addition to the content information supplied to a user, the handheld terminal 40 is able to store at the storage portion 50 the control information including the information for running a software program activated by the handheld terminal 40. In this instance, where the content information of the storage portion 50 or the control information of the software program is changed, the content information or the control information of the software program is collected by access to the content server 42 or via a transfer cable, an external memory, etc. Thereby, the content information or the control information of the software program is stored at the storage portion 50 so as to correspond to the ID information.

Further, in the above embodiment, the ID information is transmitted from the spatial light transmitter 1. However, where data of the content information is small in amount, in place of the ID information, content information such as text, sounds and images can be transmitted, as it is, from the spatial light transmitter 1 to the spatial light receiver 30 and can be input to the handheld terminal 40 through the microphone input terminal 45. Where data amount of the content information is relatively small as with the control information, the handheld terminal 40 is able to take in an information signal without any difficulty.

Further, in the above embodiment, an LED is used as the light emitting element 3 of the spatial light transmitter 1. However, an organic EL element can also be used as a light emitting element. As the light emitting portion 2, the light emitting element 3 is used not only for lighting but also for transmission. Where, for example, an LED or an organic EL element is used for displaying an image on a display, the LED or the organic EL element can be used not only for displaying the image but also for transmission in the light emitting portion 2 of the spatial light transmitter 1.

As described so far, in the spatial light communication device of the above embodiment, the spatial light receiver 30 is used by being connected to the microphone input terminal 45 of the handheld terminal 40 such as a mobile phone, by which information superimposed on spatial light and transmitted from the spatial light transmitter 1 installed at a specific position such as a ceiling can be input from the spatial light receiver 30 to the handheld terminal 40. It is, therefore, possible to input immediately necessary information to the handheld terminal 40 not through a mobile phone communication network or wireless LAN using radio waves and also to reproduce the information and the like through the handheld terminal 40.

Further, when using ID information, the digital processing portion 48 demodulates a 4-ary PPM signal by software, by which the handheld terminal 40 obtains the ID information from a light receiving signal input through the microphone input terminal 45. As a result, the spatial light receiver 30 is composed of only the light receiving portion 31 and the light receiving circuit 33, resulting in an extremely simple circuit configuration. Then, the spatial light receiver 30 is downsized to a remarkable extent and can be used simply and conveniently by being connected to the microphone input terminal 45 of the handheld terminal 40.

Still further, upon receipt of the ID information which is superimposed on spatial light and transmitted, the handheld terminal 40 reproduces content on the basis of the ID information, with the ID information being used as a trigger. Thus, a user is able to immediately listen to an audio guide of an exhibit on display for which the user is actually viewing, for example, at an art gallery, etc.

Still further, information which is transmitted by spatial light from the spatial light transmitter 1 to the spatial light receiver 30 of each handheld terminal 40 is only the ID information and short information associated thereto. Therefore, as compared with transmission of the content information as it is, both the spatial light transmitter 1 and the spatial light receiver 30 can be made simple in circuit configuration and downsized. They are not influenced by noise and the like on transmission and able to provide appropriate content quickly.

In addition, where content information such as an audio guide and explanation is provided in facilities such as an art gallery and a variety of event sites, an electric-bulb socket which is also usable for lighting is arranged in the vicinity of individual exhibits on display, and various types of ID information are stored at the ID information storage portion 8 of the spatial light transmitter 1. Each spatial light transmitter 1 is only attached to an electric-bulb socket, by which a content supplying system can be installed quite simply. Change of exhibits on display and the like can also be handled simply and conveniently only by changing the content corresponding to ID information.

In order to provide users with an explanation content of exhibits on display in an art gallery, a museum and the like, the above-constituted spatial light communication device transmits the ID information from the spatial light transmitter 1 to the spatial light receiver 30 of the handheld terminal 40. In addition to the explanation content on exhibits on display, the spatial light communication device of the present invention can be used in providing explanation content at various types of trade shows, content for advertisements of exhibited merchandise and the like, various types of audio guide information for people with visual disabilities in town, etc., and position information or map information for guiding people at the time of a disaster and the like.

Further, the above-constituted spatial light communication device can be used in services in which, for example, stamps and coupons are offered to customers visiting at shops or in services covering point cards. In this instance, the spatial light transmitter 1 is installed at each shop and a user carries the handheld terminal 40 connected to the spatial light receiver 30. When the user visited a shop, the spatial light receiver 30 receives ID information which is transmitted by being superimposed on spatial light from the spatial light transmitter 1 installed at the shop concerned. On the other hand, the spatial light communication device can be used in the following manner, that is, the handheld terminal 40 is provided with a storage portion which counts ID information on individual shops and the storage portion stores counted values as the number of stamps and points, and when the number of storage portions reaches a predetermined number, the user is offered benefits.

Still further, the above-constituted spatial light communication device can be used in time-related services such as time sales by offering discount prices of merchandise which specifies a time, and additional services. In this instance, the spatial light transmitter 1 is installed in the vicinity of each piece of merchandise and a user carries the handheld terminal 40 connected to the spatial light receiver 30. When the user comes close to each piece of merchandise, the spatial light receiver 30 receives ID information which is transmitted by being superimposed on spatial light from the spatial light transmitter 1 installed near the merchandise concerned.

On the other hand, the spatial light communication device can be used in the following manner, that is, the handheld terminal 40 is provided with a storage portion which stores details of time-related services so as to correspond to each ID information, and when timing of receiving the ID information is in agreement with time at which time-related services are provided, a user is offered benefits of the time-related services, for example, services of discounts in prices of merchandise during a specific period of time.

What is claimed is:

1. A spatial light communication device comprising:
    a spatial light transmitter which has a light emitting portion for emitting spatial light on which an information signal stored in advance or an information signal input externally is superimposed; and
    a spatial light receiver which is connected to a handheld terminal, has a light receiving portion for receiving spatial light emitted from the light emitting portion of the spatial light transmitter and also has a light receiving circuit for amplifying and outputting a light receiving signal of the light receiving portion;
    wherein
    the spatial light transmitter is provided with the light emitting portion which emits spatial light from a light emitting element, a light emission driving circuit which drives the light emitting element so as to emit light and a transmission signal reproducing portion which modulates a carrier wave by the information signal stored in advance or the information signal input externally to reproduce a transmission signal, thereby outputting the signal to the light emission driving circuit, and
    the spatial light receiver is provided with a connector portion which is connected to a microphone input terminal of the handheld terminal as a terminal for outputting a light receiving output signal of the light receiving circuit to the handheld terminal.

2. The spatial light communication device according to claim 1, wherein
    the spatial light transmitter is provided with an ID information storage portion which stores ID information of its own, and the transmission signal reproducing portion modulates a carrier wave by using an information signal containing the ID information, reproducing a transmission signal and outputting the signal to the light emission driving circuit, thereby emitting spatial light on which the information signal containing the ID information is superimposed.

3. The spatial light communication device according to claim 1, wherein
    the handheld terminal samples an analog signal input through the connector portion of the spatial light receiver at a predetermined cycle, converting the analog signal to a digital signal and demodulating the digital signal to obtain information.

4. The spatial light communication device according to claim 1, wherein
    as a light emitting element of the light emitting portion of the spatial light transmitter, used is an element which irradiates visible light, and as a light receiving element of a photodetector of the spatial light receiver, used is a photo diode for visible light.

5. The spatial light communication device according to claim 4, wherein
    an LED is used as the light emitting element of the light emitting portion of the spatial light transmitter.

6. The spatial light communication device according to claim 4, wherein
    an organic EL element is used as the light emitting element of the light emitting portion of the spatial light transmitter.

7. The spatial light communication device according to claim 1, wherein
    a screw fitting which can be attached to an electric-bulb socket is installed at a power source input portion of the spatial light transmitter.

8. The spatial light communication device according to claim 2, wherein
    the handheld terminal is provided with a storage portion which stores content information supplied to a user and control information including information for running a software program activated by the handheld terminal, where the content information of the storage portion or the control information on the software program is changed, the content information or the control information on the software program is collected, and the content information or the control information on the software program is stored at the storage portion so as to correspond to the ID information.

9. The spatial light communication device according to claim 2, wherein
    the handheld terminal is provided with a storage portion for storing content information to be supplied to a user and control information including information for running a software program activated by the handheld terminal, where the content information of the storage portion or the control information on the software program is changed, access is made to a content server on a network to collect the content information or the control information on the software program, thereby storing the content information or the control information on the software program at the storage portion so as to correspond to the ID information.

10. The spatial light communication device according to claim 1, wherein
    a power source line for inputting direct-current electricity supplied from a microphone input terminal of the handheld terminal is installed at the light receiving portion and the light receiving circuit of the spatial light receiver.

11. The spatial light communication device according to claim 10, wherein
    a capacitor is connected between the power source line installed at the light receiving portion and the light receiving circuit of the spatial light receiver and the ground.

* * * * *